(12) United States Patent
Yang et al.

(10) Patent No.: US 9,665,676 B2
(45) Date of Patent: May 30, 2017

(54) INTEGRATED CIRCUIT DESIGN SYSTEM

(71) Applicant: TAIWAN SEMICONDUCTOR MANUFACTURING COMPANY, LTD., Hsinchu (TW)

(72) Inventors: Ching-Shun Yang, Zhudong Township (TW); Steven Shen, Hsinchu (TW); W. R. Lien, Zhubei (TW); Wan-Ru Lin, Taipei (TW); Chau-Wen Wei, Hsinchu (TW)

(73) Assignee: TAIWAN SEMICONDUCTOR MANUFACTURING COMPANY, LTD. (TW)

( * ) Notice: Subject to any disclaimer, the term of this patent is extended or adjusted under 35 U.S.C. 154(b) by 0 days.

(21) Appl. No.: 15/091,197

(22) Filed: Apr. 5, 2016

(65) Prior Publication Data

US 2016/0224697 A1    Aug. 4, 2016

Related U.S. Application Data

(63) Continuation of application No. 14/307,788, filed on Jun. 18, 2014, now Pat. No. 9,330,219.

(60) Provisional application No. 61/972,939, filed on Mar. 31, 2014.

(51) Int. Cl.
*G06F 17/50* (2006.01)

(52) U.S. Cl.
CPC ........ *G06F 17/505* (2013.01); *G06F 17/5022* (2013.01); *G06F 17/5068* (2013.01); *G06F 17/5072* (2013.01); *G06F 17/5077* (2013.01); *G06F 17/5081* (2013.01)

(58) Field of Classification Search
CPC .................... G06F 17/5081; G06F 17/5068
USPC ......................................... 716/102
See application file for complete search history.

(56) References Cited

U.S. PATENT DOCUMENTS

| | | | |
|---|---|---|---|
| 7,506,277 B1 * | 3/2009 | Arora et al. ............... | 716/122 |
| 8,046,730 B1 | 10/2011 | Ferguson et al. | |
| 8,954,903 B1 | 2/2015 | Yadav et al. | |
| 9,330,219 B2 * | 5/2016 | Yang et al. ............... | 716/119 |
| 2004/0098689 A1 * | 5/2004 | Weed ....................... | 716/11 |
| 2011/0307854 A1 | 12/2011 | Lu et al. | |
| 2013/0298092 A1 | 11/2013 | Ting et al. | |
| 2013/0311965 A1 | 11/2013 | Cordovez et al. | |
| 2014/0282308 A1 | 9/2014 | Chen et al. | |
| 2015/0143314 A1 | 5/2015 | Chen et al. | |

* cited by examiner

*Primary Examiner* — Suchin Parihar
(74) *Attorney, Agent, or Firm* — Hauptman Ham, LLP (57) ABSTRACT

An integrated circuit (IC) design system includes a processor; and a non-transitory computer readable medium connected to the processor. The non-transitory computer readable medium is configured to store a configuration file containing a custom IC design parameter, to store a process design kit (PDK) containing a default IC design parameter, and to store instructions for execution by the processor. The instructions for execution by the process include instructions for extracting the custom IC design parameter from the configuration file. The instructions for execution by the process further include instructions for overwriting the default IC design parameter in the PDK with the custom IC design parameter. The instructions for execution by the process further include instructions for creating an IC design file using a module in the PDK using the custom IC design parameter in place of the default IC design parameter.

20 Claims, 6 Drawing Sheets

Figure 4

INTEGRATED CIRCUIT DESIGN SYSTEM

PRIORITY CLAIM

The present application is a continuation of U.S. application Ser. No. 14/307,788, filed Jun. 18, 2014, which claims the priority of U.S. Provisional Application No. 61/972,939, filed Mar. 31, 2014, which are incorporated herein by reference in their entireties.

BACKGROUND

Integrated circuits (ICs) are often designed with a process design platform ("PDP") having a product development kit (PDK) to produce a corresponding IC design file. The IC design file comprises one or more files and specifies configuration parameters describing the IC. One or more electronic design automation (EDA) tools receive the design file and create an IC manufacturing file to fabricate the IC, including fabricating electrical devices and routing of conductive paths (also referred to as "nets") between nodes or terminals of those electrical devices that collectively form circuits. The IC manufacturing file also comprises one or more files and specifies the manufacturing parameters describing the IC. Increasingly dense ICs cause increasingly difficult verification problems for EDA tools to overcome. Such EDA tools include design rule checker (DRC) tools to detect design rule violations according to specified IC parameters and layout versus schematic (LVS) tools to identify and check IC electrical connectivity against IC schematics.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Very large scale integration (VLSI) integrated circuits (ICs) typically contain a large number of electrical devices such as transistors, resistors, capacitors, combinatorial logic and memory, connected by nets. Each net is a separate, electrically conductive, pathway between nodes or terminals of devices that collectively forms electrical circuits. In some embodiments, a net is a separate, electrically conductive, portion of a metallization pattern on one photolithographic level of a VLSI IC. In some embodiments, a net includes portions of multiple metallization patterns on multiple photolithographic levels of a VLSI IC, with the portions on multiple levels electrically connected together by one or more vias passing between the multiple layers.

Techniques have been developed to represent IC designs at various levels of abstraction. According to these techniques, a designed IC is capable of being represented as a schematic or as a layout. A schematic is an electronic diagram of a designed IC. Schematic diagrams often include symbols that represent electrical devices such as transistors, resistors, capacitors, and other electrical devices. Schematic diagrams also often include representations of the connections between the electrical devices included in the schematic. A layout is a representation of an IC in terms of planar geometric shapes that correspond to the patterns of materials such as metal, oxide, or semiconductor layers that make up the electrical devices of an IC.

IC designers often rapidly design and verify circuits, with extensive use of standard, reusable components and design flows. EDA tools allow designers to develop an IC design at the schematic level and verify performance at the schematic level via a pre-layout simulation. If the pre-layout simulation demonstrates that the IC design at the schematic level meets specified performance characteristics, EDA tools generate a layout and perform verification tasks such as design rule checks (DRC) and layout versus schematic (LVS) checks. DRC checks compare the layout to a set of design rules that satisfy a series of recommended parameters set forth by an IC manufacturer to ensure that a manufactured IC functions properly. Design rule sets specify certain geometric and connectivity restrictions to ensure sufficient margins to account for variability in the manufacturing process. LVS checks are often performed after the DRC is complete. EDA tools usually perform LVS checks by extracting the electrical device parameters and connection parameters of the electrical devices and the connections between the electrical devices, and generating a layout netlist. An EDA tool then compares the layout netlist to the schematic netlist. If the layout netlist and the schematic netlist match within a specified tolerance or are identical, then the layout is "LVS clean."

After the layout passes the DRC and is LVS clean, EDA tools often run a post-layout simulation to estimate overall circuit performance which includes extracting resistance-capacitance (RC) values from the layout. Extracted RC values are important factors when assessing circuit performance, particularly when high precision and/or high-speed circuits are laid out.

Layout dependent effects (LDE) are also important factors when assessing circuit performance. LDE's such as the coupling effect, the noise canceling effect, device self-heating, parasitic bipolar transistor (pBJT) gain, noise corner issues, or other layout dependent effects affect circuit performance. Some EDA tools perform a layout parameter extraction (LPE) in one or more of a pre-layout stage or a post-layout stage. These extracted LPE's are considered by the pre-layout or the post-layout simulation to determine LDE's. LPE's extracted by conventional EDA tools, and the LDE's determined by the pre-layout and/or the post-layout simulations, are based on individual electrical device parameters.

Verifying standard IC devices in increasingly large, dense and highly interconnected VLSI ICs is a significant challenge to electronic design automation (EDA) tools, and this is even more pertinent for custom IC devices whose precise parameters have not been tested in different environments. Correspondingly, while existing IC device designs tend to have fewer unresolved layout design and verification problems, custom IC device designs offer far greater flexibility and performance benefits to ICs, but require correspondingly greater design and verification efforts. Greater flexibility in specifying IC devices offers significant competitive advantages over use of standard IC device designs.

An integrated circuit design method, enabling one or more of the benefits of custom IC devices without one or more, or all, of the prior design and verification difficulties, is described. A process design platform (PDP) includes IC design software tools such as a design customization module (DCM) and a process design kit (PDK) for producing an IC design file as part of an IC design, verification and fabrication process. In some embodiments, the PDK includes design rules, a set of files used to model electrical devices for building an IC associated with a particular fabrication process and IC layout information. Custom IC device parameters are specified in a configuration file corresponding to a customized IC design. The DCM receives the custom IC device parameters and modifies (customizes) parameters in the IC design file in the PDK.

Figure 1A:
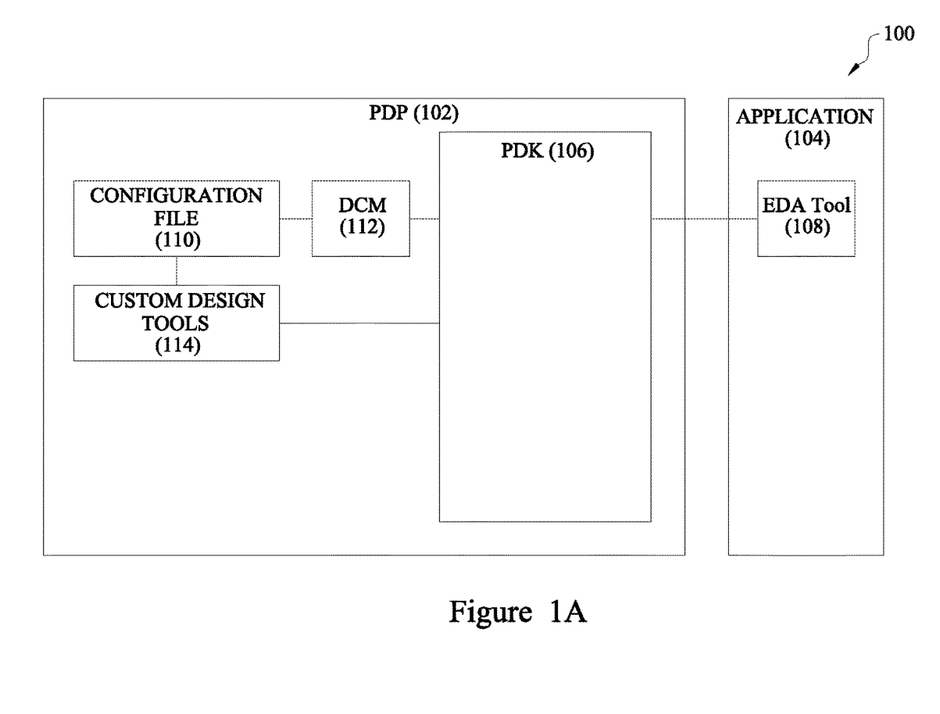
FIG. 1A is a diagram of an integrated circuit design system, in accordance with some embodiments.

FIG. 1A is a diagram of an integrated circuit design system 100, in accordance with some embodiments. The integrated circuit design system 100 includes a PDP 102 and an application 104. The PDP 102 includes a PDK 106 that creates an IC design file containing circuit, schematic and layout parameters, as described herein. The application 104 includes an EDA tool 108 that receives the IC design file from the PDK 106 in the PDP 102 and generates an IC manufacturing file containing layout and other fabrication parameters. An IC is fabricated by a fabrication facility according to the IC manufacturing file.

In some embodiments, the PDP 102 receives a configuration file 110 from an IC designer (customer), such as an electrical engineer with knowledge of IC design. The configuration file 110 contains custom IC design parameters. In some embodiments, the configuration file 110 is an American society for computing information interchange (ASCII) file. In some embodiments, the configuration file 110 is an encrypted file. The configuration file 110 is received by a design customization module (DCM) 112. Unlike PDKs that primarily or only accept previously specified standard library IC designs or attempt labor-intensive IC design customization after an IC design file is produced by a PDK, DCM 112 provides an interface to PDK 106 that enables a wide variety of IC design parameters to be specified in advance in order to produce a more customized IC design file and corresponding customized IC device. In some embodiments, customized IC devices produced through use of the DCM 112 are more dense, reliable, fast, resistant to LDEs and/or better quantified than IC devices produced without the DCM. The DCM 112 extracts custom IC design parameters from the configuration file 110 and provides access to overwrite a number of different default device parameters in a database maintained by the PDK 106, as described in more detail with regard to FIG. 1B. Some custom IC design parameters extracted by the DCM 112 do not have corresponding default device parameters, but are also maintained by the PDK 106.

In some embodiments, the PDK 106 identifies potential problems associated with a particular customized IC design specified by the configuration file 110 and received by the PDK 106 through the DCM 112. In such situations, the configuration file 110 contains custom IC design parameters suggesting or requiring additional review and/or refinement by the customer. The PDK 106 flags the potential problems and provides information about the potential problems to one or more custom design tools in a set of custom design tools 114 indicated by the type of problems identified. For example, in some embodiments a placement or routing rule is violated and the PDK 106 flags the placement or routing rule violation to a custom design tool 114 that provides a corresponding layout editing function. In some other embodiments, the PDK 106 flags the placement or routing rule violation directly to the customer, e.g., displaying an indicator on a display or generating an alert for transmission to the customer. In some embodiments, information received by the custom design tool 114 from the customer is relayed back to the PDK 106 to ensure the problem has been corrected and other rule violations were not created. In some other embodiments, information received directly from the customer is relayed back to the PDK 106 to ensure the problem has been corrected and other rule violations were not created.

In some embodiments, the custom design tools 114 provide: pre-coloring support in programmable cells (PCells); circuit device grouping in custom placement; alternative circuit device abutment scenarios; and/or an LDE-aware pre-simulation in a custom placement tool. Pre-coloring support in PCells includes enabling user-definable coloring parameters to specify coloring for PCell conductive interconnect routing, e.g., metal layer routing. Circuit device grouping in custom placement includes multiple electrical device groupings to constrain placement. Alternative circuit device abutment scenarios include deriving and presenting alternative circuit device abutment scenarios for user selection. LDE-aware pre-simulation in a custom placement tool includes identification and tracking of LDEs.

Figure 1B:
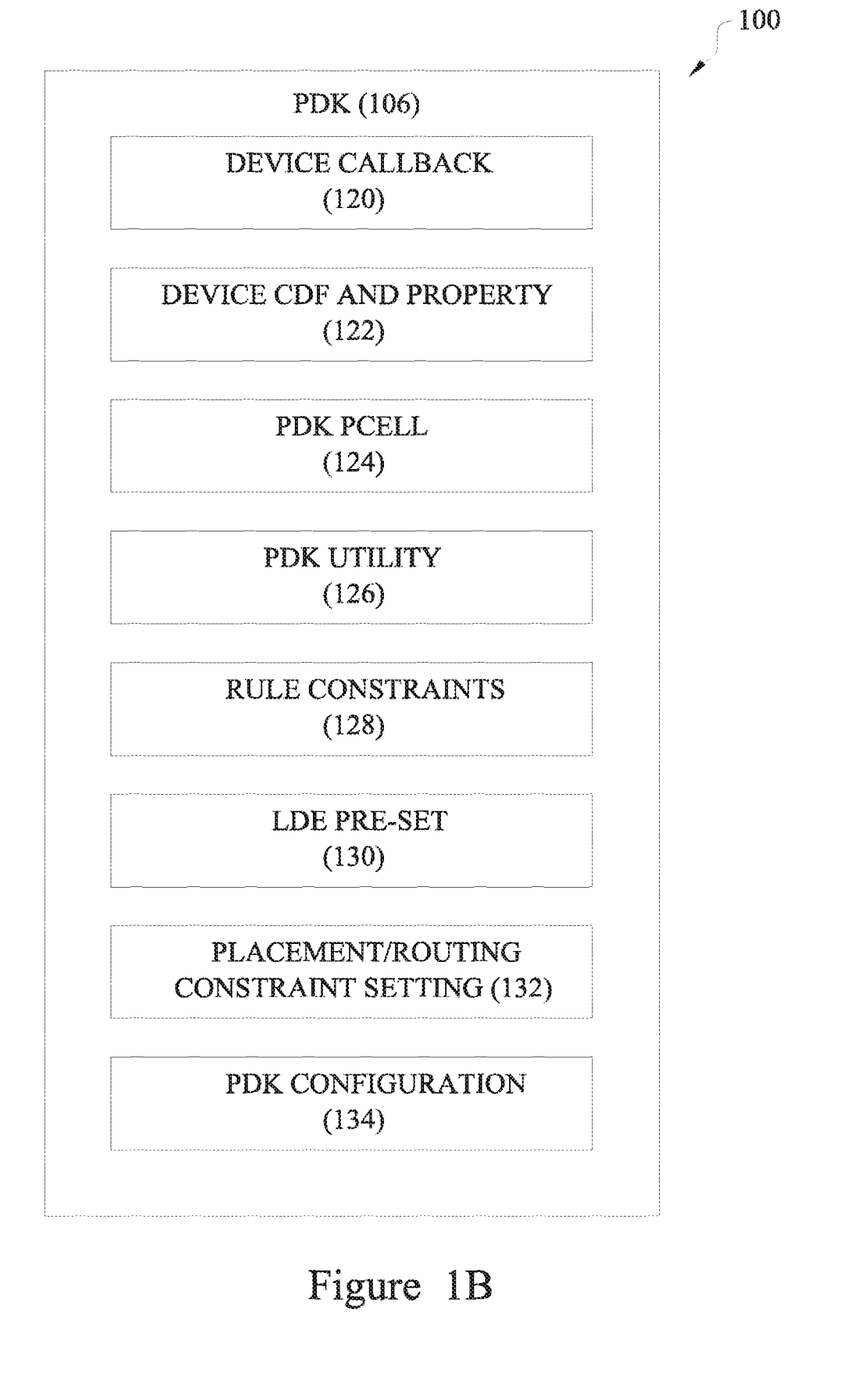
FIG. 1B is a diagram of a PDK portion of an integrated circuit design system, in accordance with some embodiments.

FIG. 1B is a diagram of a PDK 106 portion of an integrated circuit design system 100, in accordance with some embodiments. The PDK 106 includes one or more software component modules. Software component modules include one or more sets of executable instructions for causing a processor to perform one or more functionalities.

In some embodiments, software component modules in the PDK 106 include: a device callback module 120; a device component description format (CDF) and property module 122; a PDK programmable cell (PCell) module 124; a PDK utility module 126; a rule constraints module 128; an LDE pre-set module 130; a placement/routing constraint setting module 132; and/or a PDK configuration module.

The device callback module 120 in the PDK 106 is a software component module that provides design rule limitations for device types in an IC design. For example, in some embodiments, a default maximum resistor area in the device callback module 120 is specified at 4 square micrometers ($\mu m^2$), such as a resistor area that is 2 µm by 0 µm, and a maximum resistor area parameter is overwritten to 6 $\mu m^2$ in the configuration file 110. The DCM 112 extracts the 6 $\mu m^2$ maximum resistor area parameter and overwrites the corresponding parameter in the device callback module 120 in the PDK 106 to correspondingly adjust the maximum resistor area such that it is acceptable to specify a resistor having a resistor area of 2 µm by 3 µm with a resistor area of 6 $\mu m^2$.

The device CDF and property module 122 in the PDK 106 is a software component module that contains parameters specifying CDF and other similar device specifications. A CDF component description includes parameters, including attributes of parameters, of individual components and libraries of components. In some embodiments, a CDF description enables a customer to create and describe their own component. In some embodiments, the CDF description assigns parameter names and values, allocates units and default values, checks to ensure that values lie within specified ranges, dynamically changes how parameters are displayed depending on predefined conditions and/or executes a callback function if certain information is changed.

In some embodiments, the configurable file contains a CDF parameter or device property. Modification of device CDF and similar property parameters extracted by the DCM 112 from the configuration file 110 causes the device CDF and property module 122 in the PDK 106 to modify the corresponding default device parameters in the IC design file. The device CDF and property module 122 applies one or more applicable design rules, if any, and if no design rule violations are indicated, the device CDF and property module 122 overwrites at least one default IC design parameter in the IC design file with at least one corresponding custom IC design parameter. However, if a design rule is violated, an indication of the violation is stored in the configuration file 110. In some other embodiments, the PDK 106 flags the rule violation directly to the customer, e.g., displaying an indicator on a display or generating an alert for transmission to the customer.

The PDK PCell module 124 in the PDK 106 is a software component module that contains parameters specifying a PCell such as physical layout dimensions, shape, and other similar parameters. The parameters specify layout of one or more PCells in an electrical device. Modification of default values of the PDK PCell parameters extracted by the DCM 112 from the configuration file 110 causes the PDK PCell module 124 in the PDK 106 to correspondingly modify PCell parameters in the IC design file. The PDK PCell module 124 applies one or more applicable design rules, if any, and if no design rule violations are indicated, the PDK PCell module 124 overwrites at least one default IC design parameter in the IC design file with at least one corresponding custom IC design parameter. However, if a design rule is violated, an indication of the violation is stored in the configuration file 110. In some other embodiments, the PDK 106 flags the rule violation directly to the customer, e.g., displaying an indicator on a display or generating an alert for transmission to the customer.

The PDK utility module 126 in the PDK 106 is a software component module that contains parameters invoking customer-specified design tools in the custom design tools 114. The parameters specify which design tools from a library of design tools are provided to the customer. Modification of default values of the PDK utility parameters extracted by the DCM 112 from the configuration file 110 causes the PDK utility module 126 in the PDK 106 to correspondingly select design tools for use by the customer. The PDK utility module 126 applies one or more applicable design rules, if any, and if no design rule violations are indicated, the PDK utility module 126 overwrites at least one default IC design parameter in the IC design file with at least one corresponding custom IC design parameter. However, if a design rule is violated, an indication of the violation is stored in the configuration file 110. In some other embodiments, the PDK 106 flags the rule violation directly to the customer, e.g., displaying an indicator on a display or generating an alert for transmission to the customer.

The rule constraints module 128 in the PDK 106 is a software component module that contains parameters specifying a modifiable (opened) set of design configuration limitations, such as minimum and/or maximum values for particular design rules. The parameters specify minimum and/or maximum values for particular design rules in a device. Modification of default values of the parameters extracted by the DCM 112 from the configuration file 110 causes the rule constraints module 128 in the PDK 106 to correspondingly select particular design rules having minimum and/or maximum values for the IC design file. The rule constraints module 128 applies one or more applicable design rules, if any, and if no design rule violations are indicated, the rule constraints module 128 overwrites at least one default IC design parameter in the IC design file with at least one corresponding custom IC design parameter. However, if a design rule is violated, an indication of the violation is stored in the configuration file 110. In some other embodiments, the PDK 106 flags the rule violation directly to the customer, e.g., displaying an indicator on a display or generating an alert for transmission to the customer.

The LDE pre-set module 130 in the PDK 106 is a software component module that contains parameters specifying activation of checking for particular layout dependent effects, such as the coupling effect, the noise canceling effect, device self-heating, parasitic bipolar transistor (pBJT) gain, noise corner issues, or other layout dependent effects that affect circuit performance. Modification of default values of the LDE pre-set module parameters extracted by the DCM 112 from the configuration file 110 causes the LDE pre-set module 130 in the PDK 106 to correspondingly activate checking for LDEs in the IC design file. The LDE pre-set module 130 applies one or more applicable design rules, if any, and if no design rule violations are indicated, the LDE pre-set module 130 overwrites at least one default IC design parameter in the IC design file with at least one corresponding custom IC design parameter. However, if a design rule is violated, an indication of the violation is stored in the configuration file 110. In some other embodiments, the PDK 106 flags the rule violation directly to the customer, e.g., displaying an indicator on a display or generating an alert for transmission to the customer.

The placement and routing constraint setting module 132 in the PDK 106 is a software component module that contains parameters specifying an open set of design configuration limitations, such as minimum and/or maximum values. The parameters specify minimum and/or maximum placement and routing values in a device. Modification of default values of the rule constraints module parameters extracted by the DCM 112 from the configuration file 110 causes the rule constraints module 128 in the PDK 106 to correspondingly modify minimum and/or maximum placement and routing values in a the IC design file. The placement and routing constraint setting module 132 applies one or more applicable design rules, if any, and if no design rule violations are indicated, the placement and routing constraint setting module 132 overwrites at least one default IC design parameter in the IC design file with at least one corresponding custom IC design parameter. However, if a design rule is violated, an indication of the violation is stored in the configuration file 110. In some other embodiments, the PDK 106 flags the rule violation directly to the customer, e.g., displaying an indicator on a display or generating an alert for transmission to the customer.

The PDK configuration module 134 in the PDK 106 is a software component module that contains parameters specifying optional and/or alternative PDK configurations including customer-specific rules, a customer-specific tool library, etc. In some embodiments, PDK configuration parameters include a PDK parameter setting to provide customer-specific custom design including: a customer-specific source/drain routing and gate connectivity; and middle end of line/back end of line (MEOL/BEOL) layer support. Modification of default values of the parameters extracted by the DCM 112 from the configuration file 110 causes the PDK configuration module 134 in the PDK 106 to correspondingly modify PDK configuration for application to the IC design file. The PDK configuration module 134 applies one or more applicable design rules, if any, and if no design rule violations are indicated, the PDK configuration module 134 overwrites at least one default IC design parameter in the IC design file with at least one corresponding custom IC design parameter. However, if a design rule is violated, an indication of the violation is stored in the configuration file 110. In some other embodiments, the PDK 106 flags the rule violation directly to the customer, e.g., displaying an indicator on a display or generating an alert for transmission to the customer.

The modules 120-134 in the PDK 106 enable IC customization, as described above, including customer-specific layer requirements such as particular dummy/reference layer requirements, customer-specific simulation requirements, a custom callback range, and/or specific rule constraints including metal layer pitches and enclosure rules.

Figure 2A:
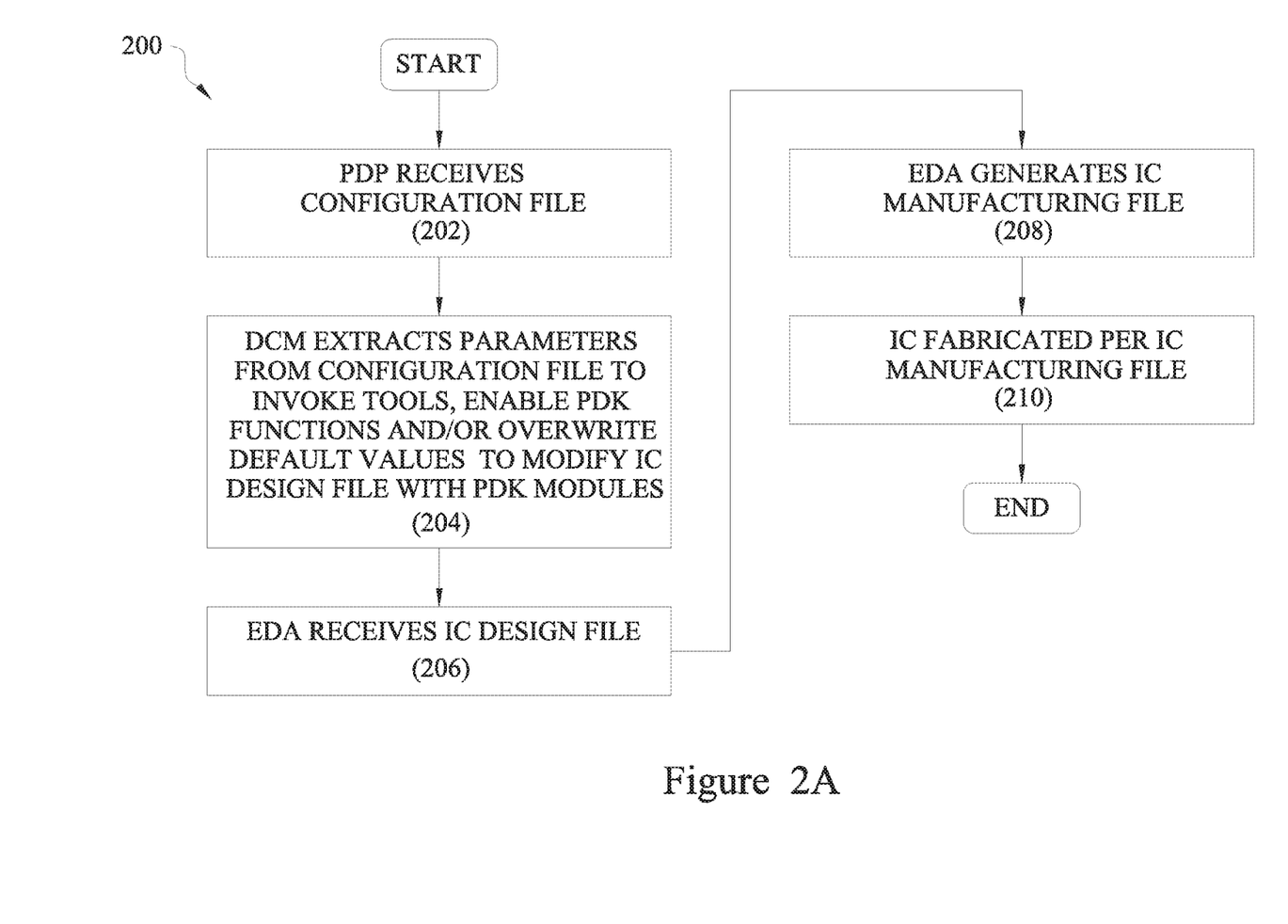
FIG. 2A is a flow chart of a method of designing an integrated circuit, in accordance with some embodiments.

FIG. 2A is a flow chart of a method of designing an integrated circuit 200, in accordance with some embodiments. The method 200 is performed by a programmed processor executing a set of instructions. In operation 202, a PDP receives a configuration file containing custom IC device parameters corresponding to a customized IC design. In operation 204, a DCM receives the custom IC device parameters from the configuration file. The DCM extracts parameters from the configuration file to invoke custom design tools, enable PDK functions and/or overwrite default values to modify an IC design file. For each PDK software component module, there is a corresponding embedded DCM procedure name. The custom IC device parameters enable modules in the PDK, within the PDP, to modify a corresponding IC design file.

In operation 206, an EDA in an application receives the IC design file from the PDK in the PDP. In operation 208, the EDA uses the IC design file received from the PDK in the PDP to create a corresponding IC manufacturing file. In operation 210, an IC is fabricated according to the IC manufacturing file from the EDA tool in the application.

Figure 2B:
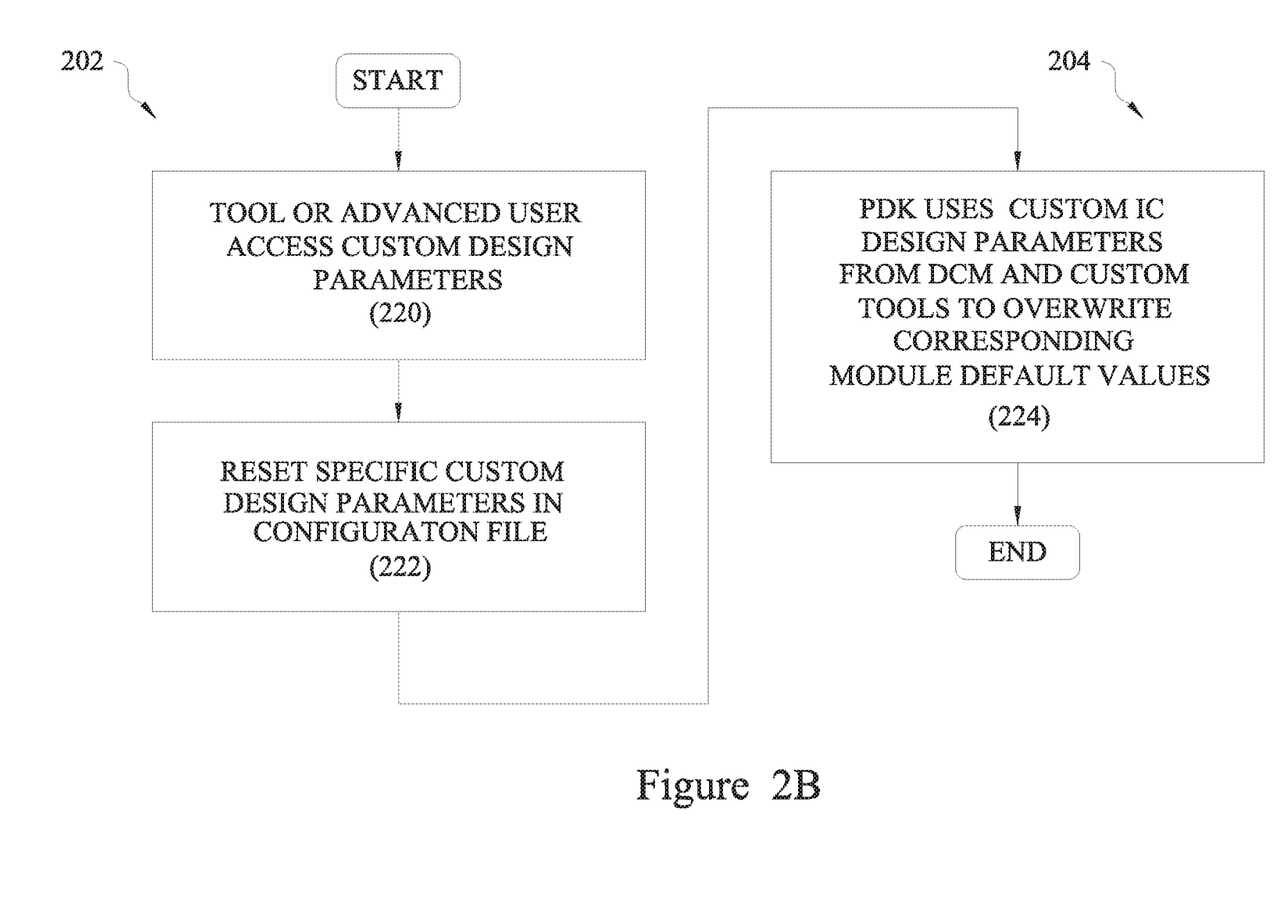
FIG. 2B is a flow chart of a portion of a method of designing an integrated circuit, in accordance with some embodiments.

FIG. 2B is a flow chart of an IC design parameter portions 202, 204 of a method of designing an integrated circuit 200, in accordance with some embodiments. The method 200 is performed by a programmed processor executing a set of instructions. Within operation 202, the process flow begins with operation 220 in which a custom design tool and/or a customer is provided with direct access to custom IC design parameters. As described above, the custom IC design parameters specify a variety of corresponding IC features, and invoke custom design tools for use in an IC design file. In operation 222, the customer directly specifies the custom IC design parameters or indirectly specifies the custom IC design parameters through the invoked custom design tool or tools.

Within operation 204, the process flow begins with operation 224 in which the PDK extracts the custom IC design parameters from the DCM and custom tools to overwrite default IC design values with custom IC design values using corresponding modules in the PDK.

Figure 3:
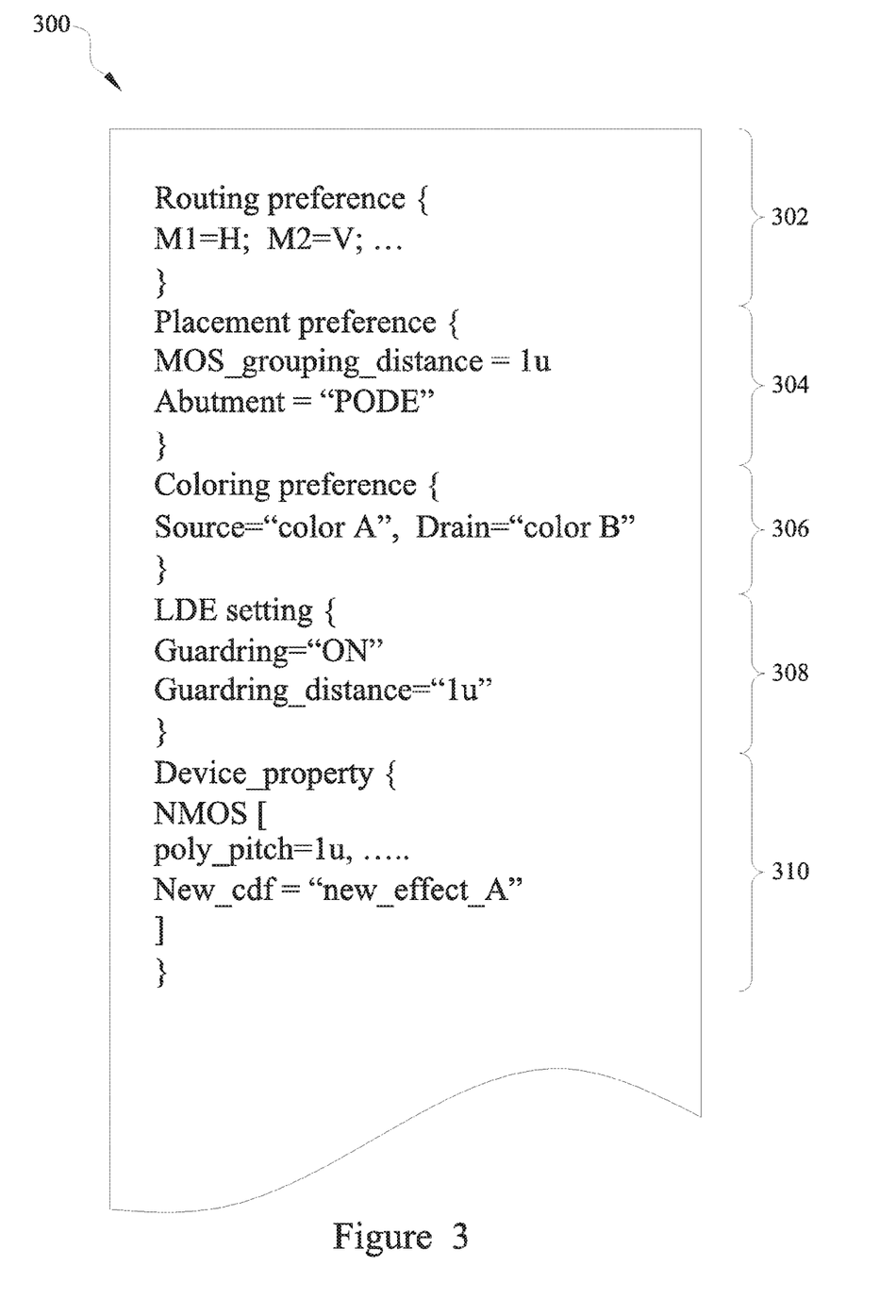
FIG. 3 is a diagram of a computer instruction coding portion of a method of designing an integrated circuit, in accordance with some embodiments.

FIG. 3 is a diagram of a computer instruction coding portion 300 of a method of designing an integrated circuit 200, in accordance with some embodiments. In section 302 of the computer instruction coding portion 300, custom IC design parameters are specified that include routing preferences. For example, metal 1 (M1) is specified to be horizontal and metal 2 (M2) is specified to be vertical. In section 304 of the computer instruction coding portion 300, custom IC design parameters are specified that include placement preferences. For example, metal oxide semiconductor (MOS) transistor grouping distance is specified as 1 um and abutment within the MOS grouping is specified to use polysilicon over diffusion edge (PODE) abutment rules.

In section 306 of the computer instruction coding portion 300, coloring preferences for PCell conductive interconnect routing are specified. For example, MOS source terminals are specified as color A and MOS drain terminals are specified as color B. In section 308 of the computer instruction coding portion 300, specific LDE-related parameters are specified. For example, a guard ring is activated having a guard ring distance of 1 uM from the surrounded electrical device or component. In section 310 of the computer instruction coding portion 300, device-specific property parameters are specified. For example, an n-type MOS (NMOS) device includes a parameter specifying polysilicon (poly) distance between recurring features (pitch) as 1 um and a new device CDF as type "new effect A."

Figure 4:
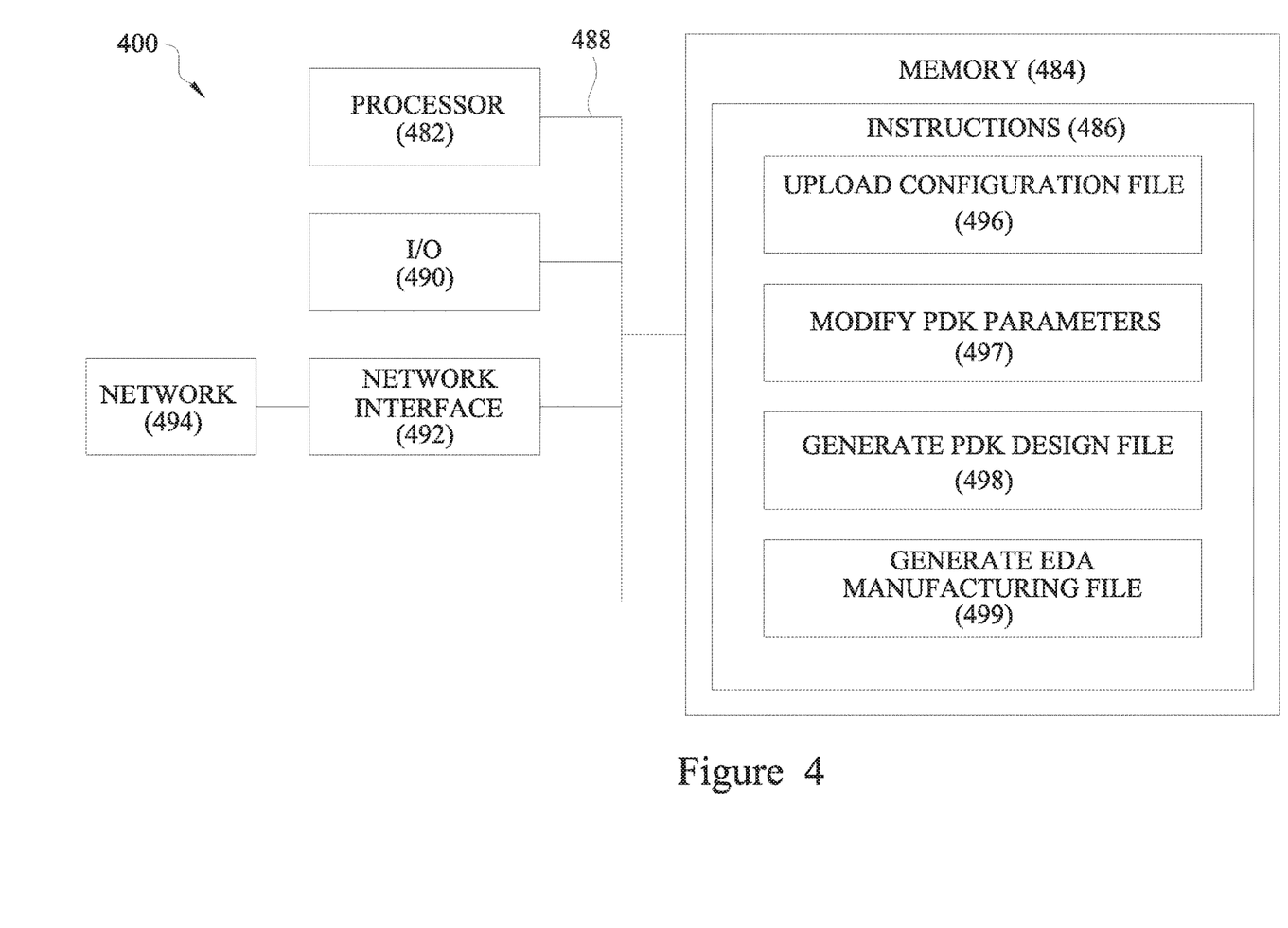
FIG. 4 is a block diagram of a computer system portion of a method of designing an integrated circuit, in accordance with some embodiments.

FIG. 4 is a block diagram of a computer system portion of a method of designing an integrated circuit, in accordance with some embodiments. In some embodiments, the computer system 400 executes a set of instructions to implement the integrated circuit design system 100 (FIGS. 1A and 1B). In some other embodiments, the computer system 400 performs the method of designing the integrated circuit 200 (FIGS. 2A and 2B). In some still other embodiments, the computer system 400 executes a set of instructions to perform the coding portion 300 of the method of designing an integrated circuit 200 (FIG. 3). Computer system 400 includes a hardware processor 482 and a non-transitory, computer readable storage medium 484 encoded with, i.e., storing, the computer program code 486, i.e., a set of executable instructions. The processor 482 is electrically coupled to the computer readable storage medium 484 via a bus 488. The processor 482 is also electrically coupled to an I/O interface 490 by bus 488. A network interface 492 is also electrically connected to the processor 482 via bus 488. Network interface 492 is connected to a network 494, so that processor 482 and computer readable storage medium 484 are capable of connecting and communicating to external elements via network 494. The processor 482 is configured to execute the computer program code 486 encoded in the computer readable storage medium 484 in order to cause computer system 400 to be usable for performing a portion or all of the operations as described with respect to the integrated circuit design system 100 (FIGS. 1A and 1B), the method of designing the integrated circuit 200 (FIGS. 2A and 2B) and the coding portion 300 of the method of designing an integrated circuit 200 (FIG. 3).

In some embodiments, the computer program code 486 includes an instruction 496 wherein the configuration file is uploaded. In some embodiments, the configuration file is wholly or partially created with custom design tools. An instruction 497 causes the DCM to modify IC device parameters in the PDK. Instruction 496 causes the PDK to generate an IC design file with the modified parameters. The IC design file is transferred to and EDA. Instruction 497 causes the EDA to generate a manufacturing file corresponding to the IC design file.

In some embodiments, the processor 482 is a central processing unit (CPU), a multi-processor, a distributed processing system, an application specific integrated circuit (ASIC), and/or a suitable processing unit.

In some embodiments, the computer readable storage medium 484 is an electronic, magnetic, optical, electromagnetic, infrared, and/or a semiconductor system (or apparatus or device). For example, the computer readable storage medium 484 includes a semiconductor or solid-state memory, a magnetic tape, a removable computer diskette, a random access memory (RAM), a read-only memory (ROM), a rigid magnetic disk, and/or an optical disk. In some embodiments, using optical disks, the computer readable storage medium 484 includes a compact disk-read only memory (CD-ROM), a compact disk-read/write (CD-R/W), a digital video disc (DVD) and/or Blu-Ray Disk.

In some embodiments, the storage medium 484 stores the computer program code 486 configured to cause computer system 400 to perform the operations as described with respect to the integrated circuit design system 100 (FIGS. 1A and 1B), the method of designing the integrated circuit 200 (FIGS. 2A and 2B) and the coding portion 300 of the method of designing an integrated circuit 200 (FIG. 3).

In some embodiments, the storage medium 484 stores instructions 486 for interfacing with external components. The instructions 486 enable processor 482 to generate operating instructions readable by a system for performing a portion or all of the operations as described with respect to the integrated circuit design system 100 (FIGS. 1A and 1B), the method of designing the integrated circuit 200 (FIGS. 2A and 2B) and the coding portion 300 of the method of designing an integrated circuit 200 (FIG. 3).

Computer system 400 includes I/O interface 490. I/O interface 490 is coupled to external circuitry. In some embodiments, I/O interface 490 includes a keyboard, keypad, mouse, trackball, trackpad, and/or cursor direction keys for communicating information and commands to processor 482.

Computer system 400 also includes network interface 492 coupled to the processor 482. Network interface 492 allows computer system 400 to communicate with network 494, to which one or more other computer systems are connected. Network interface 492 includes wireless network interfaces such as BLUETOOTH, WIFI, WIMAX, GPRS, or WCDMA; or wired network interface such as ETHERNET, USB, or IEEE-1394. In some embodiments, the operations as described above are implemented in two or more computer systems 490.

Computer system 400 is configured to receive information related to the instructions 486 through I/O interface 490. The information is transferred to processor 482 via bus 488 to determine corresponding adjustments to the transportation operation. The instructions are then stored in computer readable medium 484 as instructions 486.

As described in detail herein, the methods of designing an integrated circuit include a novel PDP, including DCM and PDK, to enable IC design customization directly by customers specifying a configuration file and/or indirectly by customers using one or more custom design tools to overcome custom design challenges.

One aspect of this description relates to an integrated circuit (IC) design system. The IC design system includes a processor; and a non-transitory computer readable medium connected to the processor. The non-transitory computer readable medium is configured to store a configuration file containing a custom IC design parameter, to store a process design kit (PDK) containing a default IC design parameter, and to store instructions for execution by the processor. The instructions for execution by the process include instructions for extracting the custom IC design parameter from the configuration file. The instructions for execution by the process further include instructions for overwriting the default IC design parameter in the PDK with the custom IC design parameter. The instructions for execution by the process further include instructions for creating an IC design file using a module in the PDK using the custom IC design parameter in place of the default IC design parameter.

Another aspect of this description relates to an integrated circuit (IC) design system. The IC design system includes a processor; and a process design platform (PDP) connected to the processor. The PDP is configured to store a configuration file containing a custom IC design parameter, to store a process design kit (PDK) containing a default IC design parameter, to store a design customization module (DCM). The PDP is configured to extract the custom IC design parameter from the configuration file. The PDP is further configured to provide access for overwriting the default IC design parameter with the custom IC design parameter. The IC design system further includes an application connected to the PDP. The application is configured to store instructions for an electronic design automation (EDA) tool. The EDA tool is configured to receive an IC design file including the custom IC design parameter. The EDA tool is further configured to generate an IC manufacturing file based on the IC design file.

Still another aspect of this description relates to a non-transitory computer readable medium. The non-transitory computer readable medium is configured to store a configuration file containing a custom integrated circuit (IC) design parameter, and to store a process design kit (PDK) containing a default IC design parameter. The non-transitory computer readable medium is further configured to store instructions for execution by a processor for extracting the custom IC design parameter from the configuration file. The non-transitory computer readable medium is further configured to store instructions for execution by the processor for overwriting the default IC design parameter in the PDK with the custom IC design parameter. The non-transitory computer readable medium is further configured to store instructions for execution by the processor for creating an IC design file using a module in the PDK using the custom IC design parameter in place of the default IC design parameter.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An integrated circuit (IC) design system, the system comprising:
   a processor; and
   a non-transitory computer readable medium connected to the processor, wherein the non-transitory computer readable medium is configured to store a configuration file containing a custom IC design parameter, to store a process design kit (PDK) containing a default IC design parameter, and to store instructions for execution by the processor for:
      extracting the custom IC design parameter from the configuration file;
      overwriting the default IC design parameter in the PDK with the custom IC design parameter; and
      creating an IC design file using a module in the PDK using the custom IC design parameter in place of the default IC design parameter.

2. The IC design system of claim 1, wherein the configuration file is an encrypted file.

3. The IC design system of claim 1, further comprising an input/output (I/O) device configured to display a potential problem identified based on overwriting the default IC design parameter with the custom IC design parameter.

4. The IC design system of claim 3, wherein the I/O device is further configured to receive input to edit the custom IC design parameter for resolving the potential problem.

5. The IC design system of claim 1, wherein the non-transitory computer readable medium is configured to store the instructions for execution by the processor for further specifying which design tools from a library of design tools are accessible to a user.

6. The IC design system of claim 1, wherein the non-transitory computer readable medium is configured to store the instructions for execution by the processor for further specifying a value for a non-default parameter maintained in the PDK.

7. The IC design system of claim 1, wherein the custom IC design parameter includes at least one of a routing preference, an electrical device placement location, a net routing, a physical layout dimension or a coloring preference.

8. The IC design system of claim 1, wherein the non-transitory computer readable medium is configured to store the instructions for execution by the processor for further generating an IC manufacturing file based on the IC design file.

9. The IC design system of claim 1, wherein the non-transitory computer readable medium is configured to store the instructions for execution by the processor for further generating instructions for manufacturing the IC based on the IC manufacturing file.

10. An integrated circuit (IC) design system, the system comprising:
    a processor;
    a process design platform (PDP) connected to the processor, wherein the PDP is configured to store a configuration file containing a custom IC design parameter, to store a process design kit (PDK) containing a default IC design parameter, to store a design customization module (DCM), and the PDP is configured to:
       extract the custom IC design parameter from the configuration file, and
       provide access for overwriting the default IC design parameter with the
       custom IC design parameter; and
    an application connected to the PDP, wherein the application is configured to store instructions for an electronic design automation (EDA) tool, wherein the EDA tool is configured to:
       receive an IC design file including the custom IC design parameter, and
       generate an IC manufacturing file based on the IC design file.

11. The IC design system of claim 10, wherein the PDK is configured to store at least one non-default IC design parameter different from the custom IC design parameter.

12. The IC design system of claim 10, wherein the PDK is configured to generate the IC design file based on the custom IC design parameter.

13. The IC design system of claim 10, wherein the PDK is configured to identify a potential problem resulting from overwriting the default IC design parameter with the custom IC design parameter.

14. The IC design system of claim 13, further comprising an input/output (I/O) device connected to the PDP, wherein the I/O device is configured to communicate the identified potential problem to a user.

15. The IC design system of claim 14, wherein the I/O device is configured to receive instructions for modifying the custom I/O design parameter.

16. The IC design system of claim 10, wherein the processor is configured to generate instructions for manufacturing an IC based on the IC manufacturing file.

17. A non-transitory computer readable medium configured to store a configuration file containing a custom integrated circuit (IC) design parameter, to store a process design kit (PDK) containing a default IC design parameter, and to store instructions for execution by a processor for:
    extracting the custom IC design parameter from the configuration file;
    overwriting the default IC design parameter in the PDK with the custom IC design parameter; and
    creating an IC design file using a module in the PDK using the custom IC design parameter in place of the default IC design parameter.

18. The non-transitory computer readable medium of claim 17, wherein the non-transitory computer readable medium is further configured to store the instructions for specifying a value for a non-default parameter maintained in the PDK.

19. The non-transitory computer readable medium of claim 17, wherein the non-transitory computer readable medium is further configured to store instructions for identifying a potential problem based on overwriting the default IC design parameter with the custom IC design parameter.

20. The non-transitory computer readable medium of claim 17, wherein the non-transitory computer readable medium is further configured to store instructions for manufacturing an IC based on the IC design file.

\* \* \* \* \*